US011924943B2

(12) United States Patent
Anderson

(10) Patent No.: US 11,924,943 B2
(45) **Date of Patent: *Mar. 5, 2024**

(54) HIGH INTENSITY REPLACEABLE LIGHT EMITTING DIODE MODULE AND ARRAY

(71) Applicant: YJB LED, INC., Wilmington, DE (US)

(72) Inventor: Deloren E. Anderson, Crosby, MN (US)

(73) Assignee: YJB LED, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/455,001

(22) Filed: Nov. 15, 2021

(65) Prior Publication Data

US 2022/0141936 A1 May 5, 2022

Related U.S. Application Data

(63) Continuation of application No. 17/248,537, filed on Jan. 28, 2021, now Pat. No. 11,178,744, which is a (Continued)

(51) Int. Cl.
*H05B 45/58* (2020.01)
*F21K 9/23* (2016.01)
(Continued)

(52) U.S. Cl.
CPC ............... *H05B 45/58* (2020.01); *F21K 9/23* (2016.08); *F21K 9/69* (2016.08); *F21K 9/90* (2013.01);
(Continued)

(58) Field of Classification Search
CPC ........ H05B 45/58; H05B 33/02; H05B 33/04; H05B 33/06; H05B 33/10; F21K 9/23;
(Continued)

(56) References Cited

U.S. PATENT DOCUMENTS

| | | |
|---|---|---|
| 3,142,664 A | 7/1964 | Bauer |
| 4,715,438 A | 12/1987 | Gabuzda et al. |

(Continued)

FOREIGN PATENT DOCUMENTS

| | | |
|---|---|---|
| CN | 1227427 A | 9/1999 |
| CN | 1341966 A | 3/2002 |

(Continued)

OTHER PUBLICATIONS

"U.S. Appl. No. 12/324,663, Notice of Allowance dated May 19, 2011", 11 pgs.

(Continued)

*Primary Examiner* — Elmito Breval
(74) *Attorney, Agent, or Firm* — Schwegman Lundberg & Woessner, P.A.

(57) ABSTRACT

A light fixture, comprising a matrix, a plurality of electrical sockets fixedly secured to the matrix and forming a rigid matrix of electrical sockets electrically interconnected in two dimensions. One or more light emitting diode modules are individually removable and replaceable within any individual electrical socket within the matrix. Each individual light emitting diode module includes a base and a light emitting diode, wherein the base is configured and arranged for fitted electrical engagement within the electrical socket.

4 Claims, 7 Drawing Sheets

Related U.S. Application Data continuation of application No. 15/295,407, filed on Oct. 17, 2016, now Pat. No. 10,925,139, which is a continuation of application No. 14/489,335, filed on Sep. 17, 2014, now Pat. No. 9,470,372, which is a continuation of application No. 13/747,202, filed on Jan. 22, 2013, now abandoned, which is a continuation of application No. 13/152,903, filed on Jun. 3, 2011, now Pat. No. 8,545,060, which is a continuation of application No. 12/324,663, filed on Nov. 26, 2008, now Pat. No. 7,972,037.

(51) Int. Cl.

| | |
|---|---|
| ***F21K 9/69*** | (2016.01) |
| ***F21K 9/90*** | (2016.01) |
| ***F21S 2/00*** | (2016.01) |
| ***F21V 23/06*** | (2006.01) |
| ***F21V 29/70*** | (2015.01) |
| ***F21V 31/00*** | (2006.01) |
| ***H05B 33/02*** | (2006.01) |
| ***H05B 33/04*** | (2006.01) |
| ***H05B 33/06*** | (2006.01) |
| ***H05B 33/10*** | (2006.01) |
| *F21V 17/00* | (2006.01) |
| *F21W 131/10* | (2006.01) |
| *F21Y 115/10* | (2016.01) |

(52) U.S. Cl.
CPC .............. *F21S 2/005* (2013.01); *F21V 23/06* (2013.01); *F21V 29/70* (2015.01); *F21V 31/005* (2013.01); *H05B 33/02* (2013.01); *H05B 33/04* (2013.01); *H05B 33/06* (2013.01); *H05B 33/10* (2013.01); *F21V 17/002* (2013.01); *F21W 2131/10* (2013.01); *F21Y 2115/10* (2016.08); *Y10S 362/80* (2013.01); *Y10T 29/4973* (2015.01)

(58) Field of Classification Search
CPC .... F21K 9/69; F21K 9/90; F21S 2/005; F21V 23/06; F21V 29/70; F21V 31/005
See application file for complete search history.

(56) References Cited

U.S. PATENT DOCUMENTS

| | | | |
|---|---|---|---|
| 5,029,335 | A | 7/1991 | Fisher et al. |
| 5,036,248 | A | 7/1991 | Mcewan et al. |
| 5,174,646 | A | 12/1992 | Siminovitch et al. |
| 5,290,280 | A | 3/1994 | Daikuzono |
| 5,410,453 | A | 4/1995 | Ruskouski |
| 5,785,116 | A | 7/1998 | Wagner |
| 5,794,685 | A | 8/1998 | Dean |
| 5,806,965 | A | 9/1998 | Deese |
| 5,936,353 | A | 8/1999 | Triner et al. |
| 5,975,194 | A | 11/1999 | Wagner |
| 6,016,038 | A | 1/2000 | Mueller et al. |
| 6,034,467 | A | 3/2000 | Roberts |
| 6,152,214 | A | 11/2000 | Wagner |
| 6,161,910 | A | 12/2000 | Reisenauer et al. |
| D438,515 | S | 3/2001 | Yokoyama et al. |
| 6,196,300 | B1 | 3/2001 | Checchetti |
| 6,255,786 | B1 | 7/2001 | Yen |
| 6,336,499 | B1 | 1/2002 | Liu |
| 6,360,816 | B1 | 3/2002 | Wagner |
| 6,402,347 | B1 | 6/2002 | Maas et al. |
| 6,414,801 | B1 | 7/2002 | Roller |
| 6,439,298 | B1 | 8/2002 | Li |
| 6,557,626 | B1 | 5/2003 | O'Sullivan et al. |
| 6,568,833 | B2 | 5/2003 | Worgen et al. |
| 6,712,486 | B1 | 3/2004 | Popovich et al. |
| 6,767,109 | B2 | 7/2004 | Plank et al. |
| 6,771,021 | B2 | 8/2004 | Cok |
| 6,776,496 | B2 | 8/2004 | Cok |
| 6,787,999 | B2 | 9/2004 | Stimac et al. |
| 6,799,864 | B2 | 10/2004 | Bohler et al. |
| 6,827,468 | B2 | 12/2004 | Galli |
| 6,851,467 | B1 | 2/2005 | Bamford et al. |
| 6,960,776 | B2 | 11/2005 | Machi |
| 7,344,284 | B2 | 3/2008 | Lynam et al. |
| 7,540,761 | B2 | 6/2009 | Weber et al. |
| 7,972,037 | B2 | 7/2011 | Anderson |
| 8,545,060 | B2 | 10/2013 | Anderson |
| 9,470,372 | B2 | 10/2016 | Anderson |
| 10,925,139 | B2 | 2/2021 | Anderson et al. |
| 11,178,744 | B2 | 11/2021 | Anderson |
| 2002/0017378 | A1 | 2/2002 | Hu |
| 2002/0018336 | A1 | 2/2002 | Liang |
| 2002/0093820 | A1 | 7/2002 | Pederson |
| 2002/0122309 | A1 | 9/2002 | Abdelhafez et al. |
| 2004/0066142 | A1 | 4/2004 | Stimac et al. |
| 2008/0157112 | A1 | 7/2008 | He et al. |
| 2009/0244894 | A1 | 10/2009 | Zhou et al. |
| 2010/0002444 | A1 | 1/2010 | Konaka |
| 2010/0128478 | A1 | 5/2010 | Anderson |
| 2010/0231131 | A1 | 9/2010 | Anderson |
| 2011/0234077 | A1 | 9/2011 | Anderson |
| 2013/0193829 | A1 | 8/2013 | Anderson |
| 2015/0219282 | A1 | 8/2015 | Anderson |
| 2017/0231057 | A1 | 8/2017 | Anderson |
| 2021/0259081 | A1 | 8/2021 | Anderson |

FOREIGN PATENT DOCUMENTS

| | | | |
|---|---|---|---|
| CN | 1359137 | A | 7/2002 |
| CN | 1462161 | A | 12/2003 |
| CN | 102227584 | A | 10/2011 |
| CN | 102227584 | B | 7/2014 |
| DE | 19528459 | A1 | 2/1997 |
| DE | 5049047 | A1 | 4/2007 |
| DE | 102005049047 | A1 | 4/2007 |
| EP | 1108612 | A2 | 6/2001 |
| EP | 1139439 | A1 | 10/2001 |
| EP | 1367676 | A1 | 12/2003 |
| EP | 2359051 | B1 | 7/2014 |
| GB | 2323434 | A | 9/1998 |
| HK | 1163225 | | 9/2012 |
| IN | 4713DELNP2011 | A | 8/2012 |
| JP | S63185257 | U | 11/1988 |
| JP | S63198086 | U | 12/1988 |
| JP | H036850 | U | 1/1991 |
| JP | H038204 | A | 1/1991 |
| JP | H03504184 | A | 9/1991 |
| JP | 05259510 | A | 10/1993 |
| JP | 2000091775 | A | 3/2000 |
| JP | 2000294002 | A | 10/2000 |
| JP | 2001118403 | A | 4/2001 |
| JP | 2001184938 | A | 7/2001 |
| JP | 2002102164 | A | 4/2002 |
| JP | 2007242244 | A | 9/2007 |
| JP | 2007258434 | A | 10/2007 |
| KR | 10-2012-0007491 | | 1/2012 |
| WO | WO-0055685 | A1 | 9/2000 |
| WO | WO-2000070687 | A1 | 11/2000 |
| WO | WO-0114789 | A1 | 3/2001 |
| WO | WO-2010062993 | A1 | 6/2010 |

OTHER PUBLICATIONS

"U.S. Appl. No. 12/324,663, Preliminary Amendment Filed Mar. 10, 2011", 8 pgs.
"U.S. Appl. No. 13/152,903 , Response filed Apr. 5, 2012 to Non Final Office Action dated Mar. 21, 2012", 9 pgs.
"U.S. Appl. No. 13/152,903, 312 Amendment filed Jul. 24, 2013", 6 pgs.
"U.S. Appl. No. 13/152,903, Corrected Notice of Allowance dated Aug. 26, 2013", 1 pg.
"U.S. Appl. No. 13/152,903, Non Final Office Action dated Feb. 27, 2013", 7 pgs.

(56) References Cited

OTHER PUBLICATIONS

"U.S. Appl. No. 13/152,903, Non Final Office Action dated Mar. 21, 2012", 8 pgs.
"U.S. Appl. No. 13/152,903, Notice of Allowance dated Jul. 19, 2013", 9 pgs.
"U.S. Appl. No. 13/152,903, Notice of Allowance dated Aug. 16, 2012", 7 pgs.
"U.S. Appl. No. 13/152,903, Notice of Allowance dated Dec. 7, 2012", 8 pgs.
"U.S. Appl. No. 13/152,903, Preliminary Amendment filed Nov. 16, 2012", 7 pgs.
"U.S. Appl. No. 13/152,903, PTO Response to 312 Amendment dated Aug. 14, 2013", 2 pgs.
"U.S. Appl. No. 13/152,903, PTO Response to 312 Amendment dated Aug. 26, 2013", 1 pg.
"U.S. Appl. No. 13/152,903, Response filed Apr. 30, 2013 to Non Final Office Action dated Feb. 27, 2013", 8 pgs.
"U.S. Appl. No. 13/747,202, Final Office Action dated Mar. 17, 2014", 8 pgs.
"U.S. Appl. No. 13/747,202, Non Final Office Action dated Jun. 6, 2013", 10 pgs.
"U.S. Appl. No. 13/747,202, Response filed Dec. 6, 2013 to Non Final Office Action dated Jun. 6, 2013", 7 pgs.
"U.S. Appl. No. 14/489,335, Non Final Office Action dated Jul. 8, 2015", 7 pgs.
"U.S. Appl. No. 14/489,335, Notice of Allowance dated Jun. 17, 2016", 7 pgs.
"U.S. Appl. No. 14/489,335, Response filed Jan. 6, 2016 to Non Final Office Action dated Jul. 8, 2015", 5 pgs.
"U.S. Appl. No. 15/295,407, Advisory Action dated Sep. 10, 2019", 3 pgs.
"U.S. Appl. No. 15/295,407, Appeal Brief filed Apr. 30, 2020", 17 pgs.
"U.S. Appl. No. 15/295,407, Corrected Notice of Allowability dated Aug. 18, 2020", 4 pgs.
"U.S. Appl. No. 15/295,407, Final Office Action dated Apr. 30, 2019", 13 pgs.
"U.S. Appl. No. 15/295,407, Non Final Office Action dated Jun. 30, 2017", 14 pgs.
"U.S. Appl. No. 15/295,407, Non Final Office Action dated Sep. 28, 2018", 13 pgs.
"U.S. Appl. No. 15/295,407, Notice of Allowance dated Jul. 1, 2020", 7 pgs.
"U.S. Appl. No. 15/295,407, Notice of Allowance dated Oct. 15, 2020", 7 pgs.
"U.S. Appl. No. 15/295,407, Preliminary Amendment filed Apr. 28, 2017", 6 pgs.
"U.S. Appl. No. 15/295,407, Response filed Jan. 2, 2018 to Non Final Office Action dated Jun. 30, 2017", 8 pgs.
"U.S. Appl. No. 15/295,407, Response filed Jan. 23, 2019 to Non Final Office Action dated Sep. 28, 2018", 11 pgs.
"U.S. Appl. No. 15/295,407, Response filed Aug. 30, 2019 to Final Office Action dated Apr. 30, 2019", 11 pgs.
"U.S. Appl. No. 17/248,537, Corrected Notice of Allowability dated Jul. 28, 2021", 3 pgs.
"U.S. Appl. No. 17/248,537, Notice of Allowance dated Jul. 19, 2021", 7 pgs.
"U.S. Appl. No. 17/248,537, Preliminary Amendment filed May 11, 2021", 7 pgs.
"Chinese Application Serial No. 200980147470.8, Office Action dated Apr. 12, 2013", with English translation of claims, 21 pgs.
"Chinese Application Serial No. 200980147470.8, Office Action dated Jul. 17, 2012", With English Translation, 22 pgs.
"Chinese Application Serial No. 200980147470.8, Office Action dated Sep. 30, 2013", with English translation of claims, 23 pgs.
"Chinese Application Serial No. 200980147470.8, Response filed Feb. 1, 2013 to Office Action dated Jul. 17, 2012", 4 pgs.
"Chinese Application Serial No. 200980147470.8, Response filed Feb. 1, 2013 to Office Action dated Jul. 17, 2012", with English translation of claims, 9 pgs.
"Chinese Application Serial No. 200980147470.8, Response filed Mar. 3, 2014", 4 pgs.
"Chinese Application Serial No. 200980147470.8, Response filed Jun. 7, 2013 to Office Action dated Apr. 12, 2013", 4 pgs.
"Chinese Application Serial No. 200980147470.8, Response filed Dec. 13, 2013 to Office Action dated Sep. 30, 2013", 4 pgs.
"European Application Serial No. 09759860.1, Office Action dated Jul. 5, 2013", 27 pgs.
"Indian Application Serial No. 4713/DELNP/2011, First Examiners Report dated Jul. 23, 2018", 16 pgs.
"International Application Serial No. PCT/US2009/065988, International Preliminary Report on Patentability dated Jun. 21, 2011", 7 pgs.
"International Application Serial No. PCT/US2009/065988, Search Report dated Mar. 1, 2010", 6 pgs.
"International Application Serial No. PCT/US2009/065988, Written Opinion dated Mar. 1, 2010", 6 pgs.
"Japanese Application Serial No. 2011-537747, Office Action dated Nov. 26, 2013", 4 pgs.
"Leading the Lighting Revolution", CREE LED Lighting Catalog, CREE LED Lighting, Morrisville, NC, (2008), 10 pgs.
"LED High-Grade Energy-Saving Lamps", LEDMY Professional LED Products Manufacturer Catalog, (May 4, 2010), 5 pgs.
"Mexican Application Serial No. MX/a/2011/005582, Response filed Jan. 17, 2013", 10 pgs.
"Picture of LED Light Array (Back)", [Online]. Retrieved from the Internet: <URL:http://www.yjbled.com/slideshow.php?gim=590&catalogID=32>, (Nov. 26, 2008), 1 pg.
"Picture of LED Light Array (Front)", [Online]. Retrieved from the Internet: <URL:http://www.yjbled.com/slideshow.php?gim=573&catalogID=32>, (Nov. 26, 2008), 1 pg.
"Picture of LED Light Array (Side)", [Online]. Retrieved from the Internet: <URL:http://www.yjbled.com/slideshow.php?gim=586&catalogID=32>, (Nov. 26, 2008), 1 pg.
"The Gateway to Perfection, 6" LED Architectural Retrofit Housing Series", Oracle Lighting catalog, Copyright 2008, (2008), 2 pgs.
"Yung's 2007-2008 LED Lighting Catalog", (2007), 7 pgs.
Craford, M George, "LEDs Challenge the Incandescents: Materials that make light-emitting dides brighter and less power-hungry open exciting new applications for semiconductor lamps", Circuits and Devices, (Sep. 1992), 24-29.
Koike, Masayoshi, "GaN-based Light Emitting Devices", (2012), 1 pg.
Nakamura, "Current Status of GaN-Based Solid-State Lighting", MRS Bulletin, (2009), 101-7.
Pandis, et al., "Long-term Failure Rate of Brackets Bonded with Plasma and High-intensity Light-emitting Diode Curing Lights", Angle Orthodontist, vol. 77, (2007), 707-10.
Paul, et al., "A Single Stage High Power Factor Supply Based on Integrated Buck Flyback Converter", International Journal of Advanced Research in Electrical, Electronics and Instrumentation Engineering vol. 2, (2013), 680-88.
Santini, et al., "Temperature Rise Within the Pulp Chamber During Composite Resin Polymerisation Using Three Different Light Sources", The Open Dentistry Journal, vol. 2, (2008), 137-41.
Zhou, et al., "Quasi-Active Power Factor Correction Cicuit for HB LED Driver", IEEE Transactions on Power Electronics, vol. 23, No. 3, (2008), 1410-15.

HIGH INTENSITY REPLACEABLE LIGHT EMITTING DIODE MODULE AND ARRAY

RELATED APPLICATIONS

This application is a Continuation of U.S. application Ser. No. 17/248,537, filed on Jan. 28, 2021, which is a Continuation of U.S. application Ser. No. 15/295,407, filed on Oct. 17, 2016, which is a Continuation of U.S. application Ser. No. 14/489,335, filed on Sep. 17, 2014, which is a Continuation of U.S. application Ser. No. 13/747,202, filed on Jan. 22, 2013, which is a Continuation of U.S. application Ser. No. 13/152,903, filed on Jun. 3, 2011, which is a Continuation of U.S. application Ser. No. 12/324,663, filed on Nov. 26, 2008, which applications are incorporated herein by reference in their entirety.

BACKGROUND

Light emitting diodes have long been used individually or grouped together as background or indicating lights in electronic devices. Because of the efficient light production, durability, long life, and small size light emitting diodes were ideal for electronic applications.

Higher powered light emitting diodes also are used in applications where a stronger emission of light is needed. In some high intensity applications, multiple fixed sets of serially connected light emitting diodes, each set having a common voltage drop are used to obtain desired luminescence. The sets are formed along rails or bars, where an entire rail or bar may be replaced by the manufacturer if any portion of the rail becomes defective. If the manufacturer is located a long distance, or has a backlog of repairs to make, it can take a long time to obtain such a repair. Such applications may be used indoors or outdoors. The light emitting diodes electrically connected operate as a single application, sealed and protected as a single linear group. Replacement of the whole group of fixed light emitting diodes is needed if just one diode fails.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
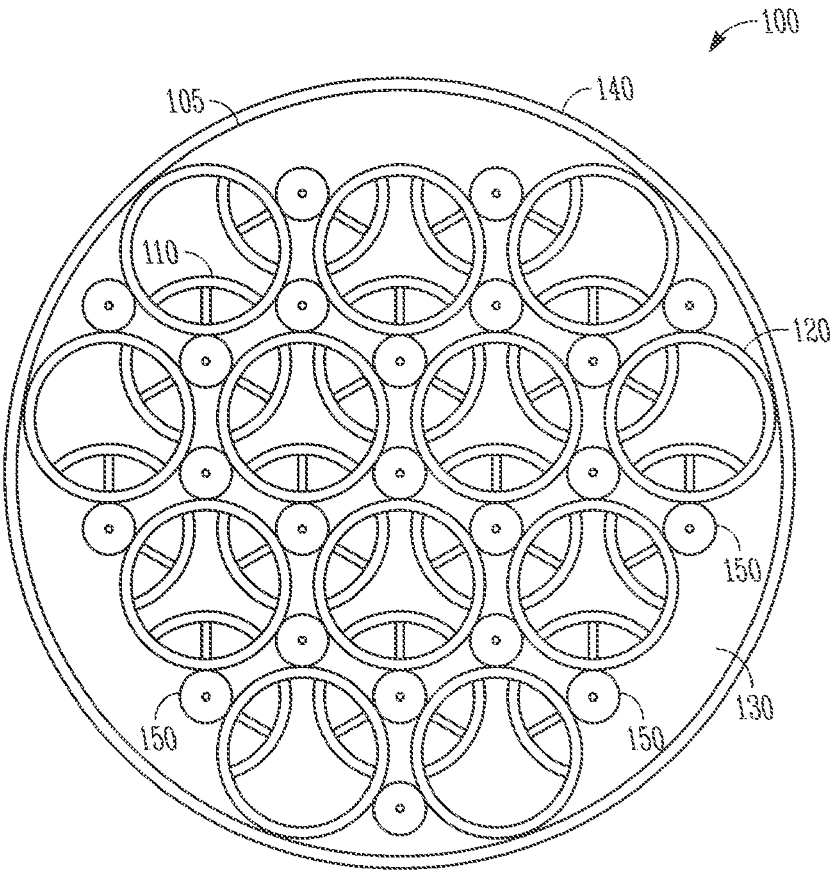
FIG. 1 is a top view of a matrix of light emitting diode modules according to an example embodiment.

A high intensity light emitting diode light fixture for producing large volume of light for lighting large areas, such as parking lots, parking ramps, highways, streets, stores, warehouses, gas station canopies, etc., is illustrated in FIG. 1 generally at 100. FIG. 1 is a top view of light fixture 100, which includes a rigid matrix 105. Multiple high intensity light emitting diodes may be encapsulated into modules 110, which may be seen in FIG. 1 through cylindrical cooling structures 120. In this view, the modules provide light pointing away from the surface of the figure.

In one embodiment, the cooling structures 120 and modules 110 are supported by the matrix 105, which is formed of aluminum in one embodiment to provide both strength and heat conduction to help keep the modules 110 cool. A board 130, such as a circuit board, may be placed integrated with the cooling structures 120 and provides appropriate electrical conductors between the modules 110. In one embodiment, board 130 may be a standard circuit board with metallization for forming the conductors. In one embodiment, a frame 140 may be formed around the matrix and be integrated with the matrix.

The matrix and cooling structures 120 may be formed of aluminum or other material that provides adequate structural support, is light weight, and conducts heat well. A plurality of electrical sockets 150 may be formed on the matrix between the cooling structures and are secured to the board 130 in one embodiment, forming a matrix of electrical sockets 150 that may be electrically interconnected in two dimensions by the board 130. One or more light emitting diode modules 110 may be individually removable and replaceable within any individual electrical socket within the matrix, which may be rigid in one embodiment and may be secured within the matrix 105 by an epoxy or other filler material having suitable heat conducting and retentive properties to ensure the board 130 is securely held in place over the sockets 150.

As may be seen in FIG. 1, more sockets than can accommodate modules may be provided in various patterns. The additional sockets provide flexibility for a multitude of lighting needs. In one embodiment, the sockets may provide for the use of an optimum number of modules to provide a high volume of lighting for outdoor applications, such as parking lots, parking ramps, highways, streets, stores, warehouses, gas station canopies. For lower volume lighting applications, fewer modules may be used in fewer sockets. For each configuration of sockets with modules, the electrical connections may be modified to provide a proper voltage for each module.

Figure 2A:
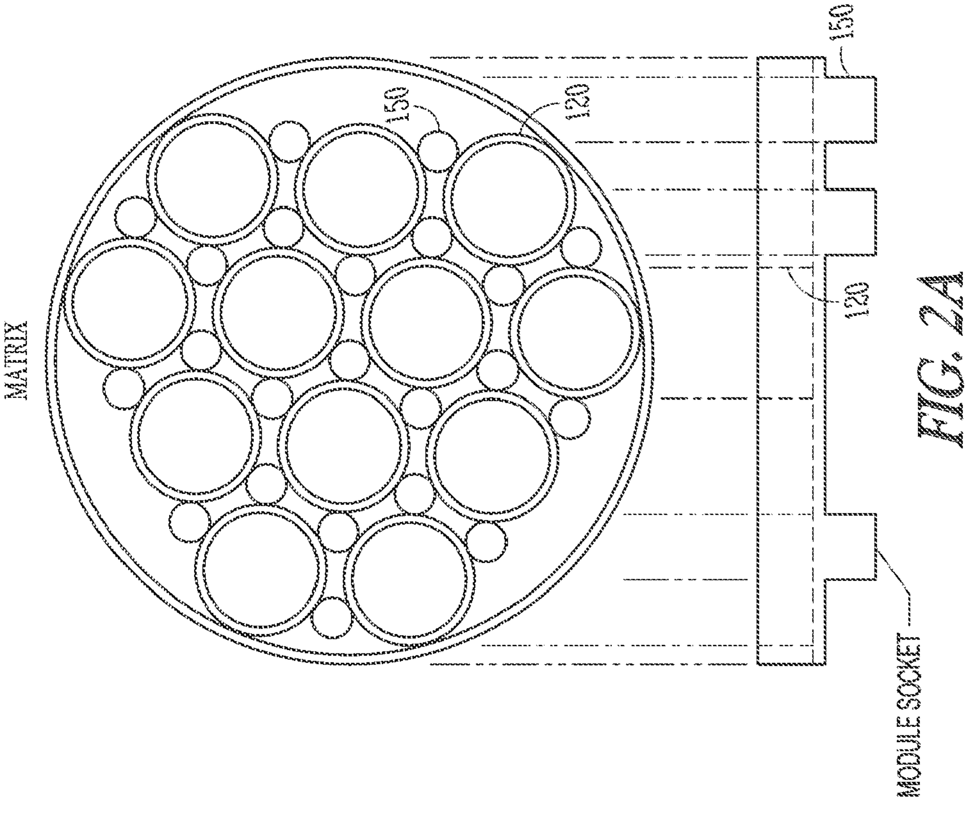
FIG. 2A is a top view of a matrix including sockets for light emitting diode modules according to an example embodiment.

FIG. 2A is a top view of matrix 105 including sockets 150 for light emitting diode modules according to an example embodiment. As shown the matrix 105, with cooling structures 120 and sockets 150 have some depth to them that provides both structural support may be formed of heat conducting material. The sockets are disposed between the cooling structures such that heat is easily conducted to the cooling structures.

Figure 2B:
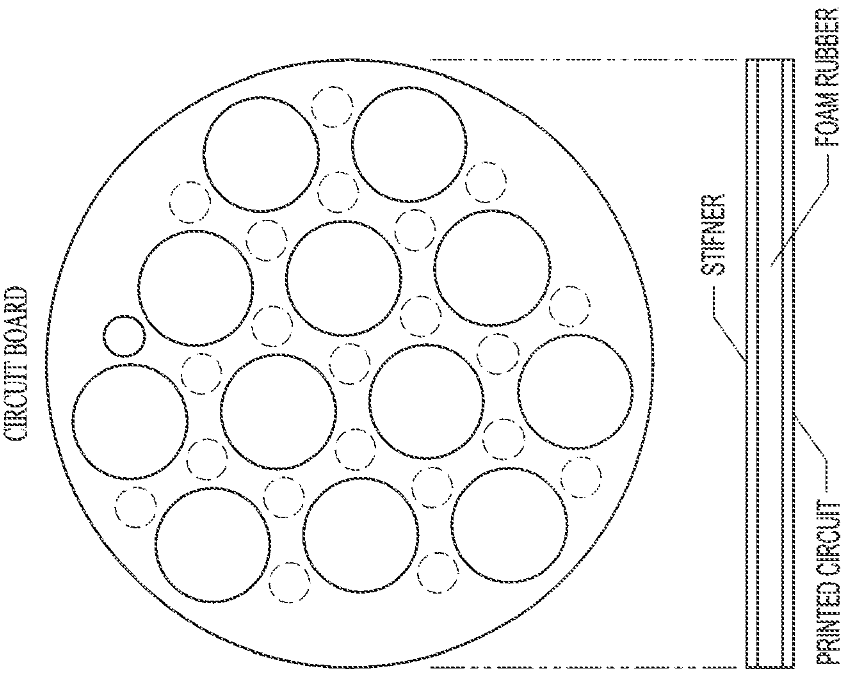
FIG. 2B is a top view of a circuit board for mating with the matrix of FIG. 2B according to an example embodiment.

FIG. 2B is a top view of circuit board 130 for mating with the matrix of FIG. 2B according to an example embodiment. The board 130 has openings corresponding to cooling structures 120 in one embodiment, and sets of connectors corresponding to the sockets when coupled to the matrix.

Figure 3:
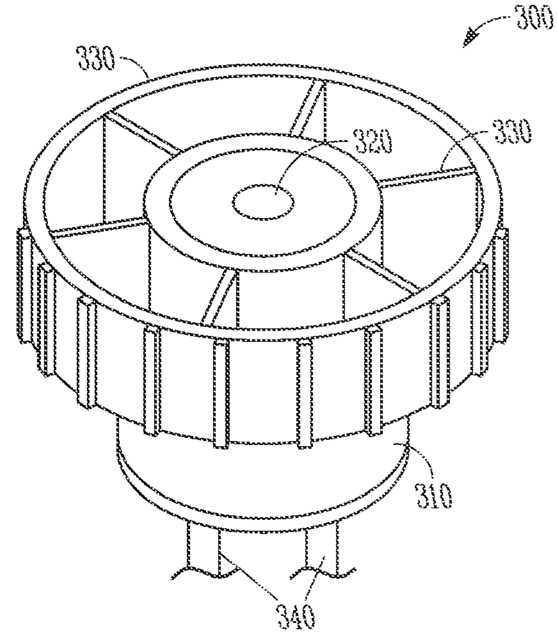
FIG. 3 is a perspective view of a high intensity light emitting diode module according to an example embodiment.

Each individual light emitting diode module as shown in further detail at 300 in FIG. 3 may include a base 310 and a light emitting diode 320. The base may be configured and arranged for fitted electrical engagement within the electrical socket 150. Light emitting diode modules 300 may fit in the electrical sockets 150 though multiple different types of connections. In various embodiments, the light emitting diode 320 may be different colors with most colors being currently commercially available.

The base 310 of the light emitting diode module 300 may include heat dissipating radial fins 330 to dissipate heat away from the electrical socket 150 and leads or contacts 340 for coupling to connectors on board 130 for providing power to the light emitting diode 320. Because the light emitting diode module 300 may be used for both inside and outside applications, some embodiments are able to withstand a large ambient temperature range provided it is not too warm for proper operation, and may also withstand inclement weather conditions including rain, snow, ice, dust, winds up to about 150 miles per hour, etc., while still efficiently emitting light. The heat dissipating fins 330 may extend radially from a top of the base 310, drawing heat away from the light emitting diode 320 and acting as a heat sink to prevent damage to the light emitting diode or the surrounding components. The fins may couple to a heat fin ring 350 which may provide stability and a means of permitting ease of handling when assembling or replacing modules 300 in sockets 150.

Figure 4:
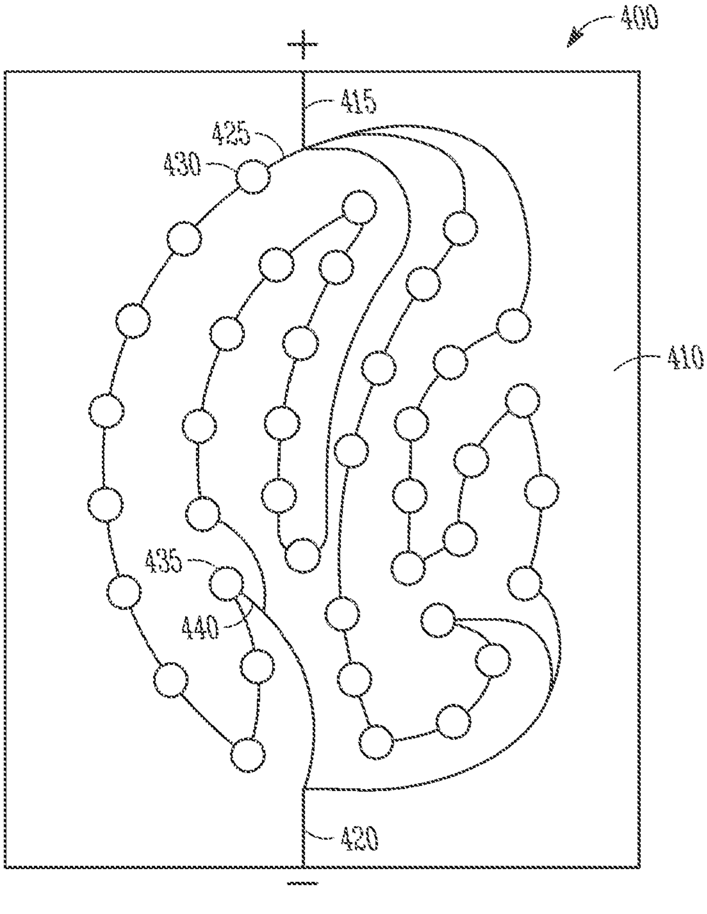
FIG. 4 is block schematic representation of wired sockets for a matrix of modules according to an example embodiment.

FIG. 4 is a block diagram schematic representation of a connector board for a high intensity light emitting diode array shown generally at 400. Openings in the board for the cooling structures are not shown. In one embodiment, a board 410 is provided with a positive connector 415 and a negative connector 420 for connection to a power source and driver, not shown. Positive connector 415 is electrically coupled via a connector 425 to a first socket 430. Given a supply of 24 volts across connectors 415 and 420, ten sockets are serially electrically coupled, ending with socket 435, which in turn, is coupled via connector 440 to negative connector 420. These connections, together with intermediate serial connections to eight other sockets provides a voltage drop of 2.4 volts DC for each light emitting diode plugged into the socket. This ensures that each light emitting diode will receive the proper voltage for proper operation.

If a different supply level is provided, and/or different light emitting diodes are used with different voltage drops, it is a simple matter to divide the supply by the voltage drop to determine how many sockets should be connected serially. The board may then be reconfigured consistent with the number of sockets needed. As shown in FIG. 4, there are four such sets of serially connected sockets, each being coupled between the positive and negative connectors 415 and 420. Many other different configurations are possible.

In still further embodiments, adaptive power supplies may be used, and the number of modules in series may be varied with the supply adapting to the proper output required to drive the modules. All sockets may be active with such drivers and modules plugged in as desired. In some embodiments, modules may be removed or added in series if needed to be compatible with the supply and driver circuitry. All the sockets may be wired in series in one embodiment. Plugs to short circuit open sockets may be used to maintain the series connection, or suitable bypass circuitry may be used to maintain a series connection if modules in sockets have malfunctioned, or sockets are not used in some lighting applications.

In one embodiment, the current sockets are arranged in an oval shape, but many other shapes may be easily used. The board 410 may be suitably shaped to conform to the sockets to provide a shape suitable for aesthetic design purposes. Similarly, the matrix 105 as shown in FIG. 1 may also take many different shapes, from rectangular or circular as shown to just about any shape desired, such as "u" shaped or kidney bean shaped to name a few. Further, elongated shapes of one or more rows of sockets may be provided.

The matrix 105 and board 130 in some embodiments may be made of any weather resistant metal such as aluminum or other material suitable for dissipating heat. In one embodiment, the electrical sockets are in a uniformly disbursed triangular matrix in relation to each other and may be part of a cast matrix 105.

Figure 5:
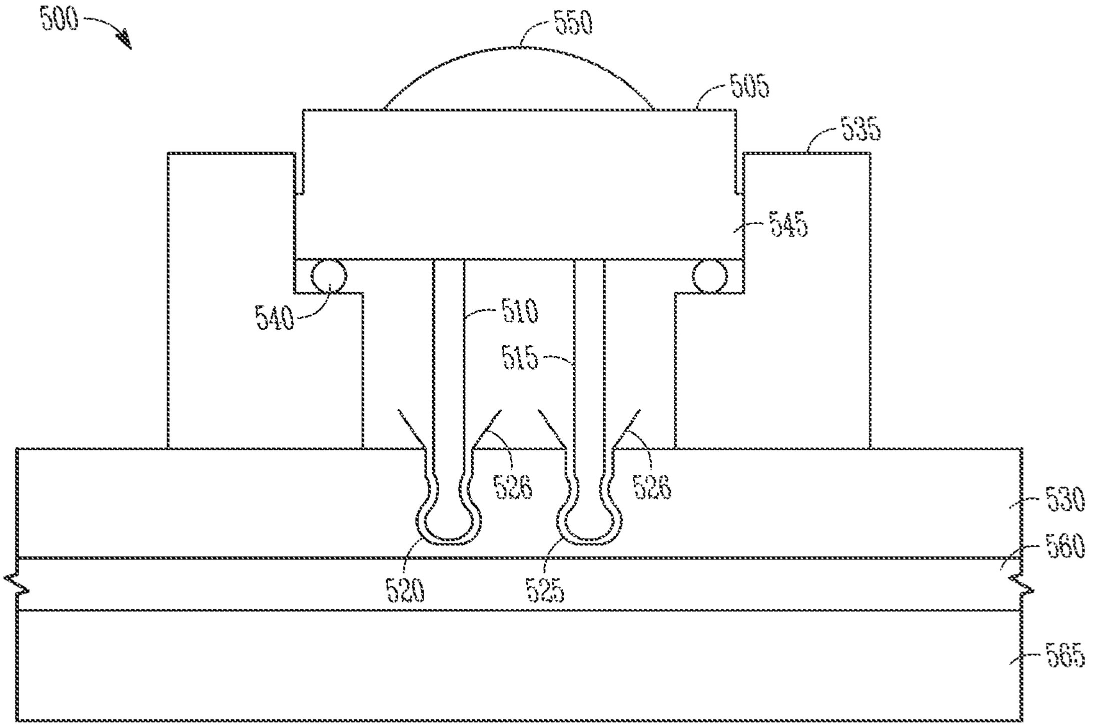
FIG. 5 is a block cross sectional view of a module supported in a socket according to an example embodiment.

In one embodiment, the electrical sockets 150 may be designed to accommodate a removable and replaceable light emitting diode module with different connection types including, but not limited to, screw-in or Edison type connections, a bayonet-type connection, and snap-in or friction connection as illustrated at 500 in FIG. 5.

In FIG. 5, a module 505 is secured via conducting pins 510, 515 into mating connectors 520, 525 in a board 530. The conducting pins and mating connectors provide for a snap-in or friction connection that holds the module 505 securely within a socket 535. In one embodiment, the mating connectors 520 and 525 may be provided with guides 526 that ensure that the pins are properly inserted and guided into the female mating connectors 520, 525, which may be made of brass in one embodiment and be spring loaded from the sides to retentatively engage the pins 510, 515. The female connectors may extend partly above the board, or within the board in various embodiments. When within the board, the board essentially has a larger opening than the diameter of the pins, and narrows to the point of the snap-in or friction connection portion of the matting connectors.

In one embodiment, a sealing member such as a ring, disk or washer 540 is positioned between the module 505 and a surface of the socket 535. The sealing member 540 is compressed when the module 505 is fully secured by the pins and mating connectors to provide a water tight seal and protect the electrical connections from elements which might degrade the electrical contact formed by such connections. In various embodiments, the sealing member may be formed of rubber, latex, Teflon, silicon rubber or like compressible material. To provide for larger tolerances with respect to the thickness of the board 530 and the distance of the connectors 520, 525 from the module when seated in the socket, the compressible sealing member may be formed with a hollow center in some embodiments. In further embodiments, the sealing member operates to provide a seal over a wide depth of compression.

In a further embodiment, plugs may be formed in the same shape as module 505, having pins that mate with the mating connectors 520, 525 to provide a seal around sockets that are not used for operational modules. The pins of such plugs may be electrically isolated from each other to ensure that no short circuits occur, or may provide a short circuit to properly maintain a series connection in a pre-wired string of sockets. Such plugs ensure integrity of all electrical connections in the board when properly used in all sockets not containing modules 505.

The ability to easily remove and replace modules in a sealing manner facilitates maintenance and repair of high intensity large volume matrix lighting solutions. Each individual light emitting diode module may be removed from an individual socket within the matrix. Because the individual light emitting diode modules are individually replaceable, if one module fails there is no need to replace an entire bundle or group of electrical sockets or modules. Simple removal and replacement of the failed module may be quickly performed. Furthermore, light emitting diode modules emitting different colors may be rearranged within the matrix to produce different color arrangements without replacement of the entire bundle of electrical sockets or modules.

Module 505 also illustrates a lens 550 coupled to the light emitting diode within module 505 and providing a protective seal. The lens 550 may be placed on and adhered to a filling material surrounding the actual light emitting diode. As the filling material solidifies, the lens may be securely fastened to the filling material. Many different types and shapes of lenses may be used. For large area high intensity lighting applications, the lens may be shaped to provide directional lighting, or a widely dispersed beam of light such that when all the modules in an array are properly oriented, a desired pattern of light is provided to light a large area, such as a parking lots, parking ramps, highways, streets, stores, warehouses, gas station canopies. Similarly, different lenses may be used for many different applications, such as for forming spot lights, narrow beams from each module may be desired.

Module 505 may also be provided with guides 545, which along with mating guides in a socket, ensure that the module is inserted into the socket in a desired orientation. In one embodiment, the guides 545 may be ridges extending outward from the module and mating with grooves in the module to provide a guide. In further embodiments, the grooves may be on the module with mating ridges on the socket. Many different shapes and combinations of grooves and ridges may be provided in various embodiments.

In yet a further embodiment, board 530 may be formed with a filling material 560, and a further board 565. Such a combination provides a seal for the conductors on the board and protects them from the elements.

Figure 6:
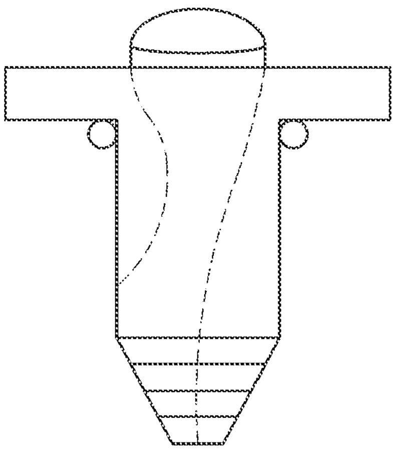
FIG. 6 is a block cross sectional view of a module having a different connection mechanism to provide a sealed connection with a socket according to an example embodiment.

FIG. 6 is a further embodiment 600 of a screw in type of connector, commonly referred to as an Edison connector. A sealing member is also provided. In this embodiment, a simple cylinder may be used as the socket, with the top portion of the module with the sealing member simply compressed against the tope of the socket when the module is fully engaged in a retentive relationship with the socket.

Figure 7:
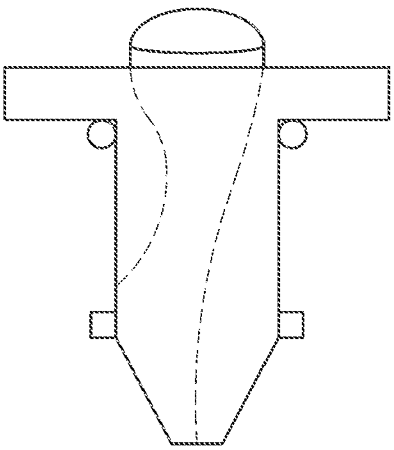
FIG. 7 is a block cross sectional view of a module having a different connection mechanism to provide a sealed connection with a socket according to an example embodiment.

FIG. 7 is a further embodiment 700 of a bayonet type connector, also having a sealing member that is similarly compressed.

Figure 8:
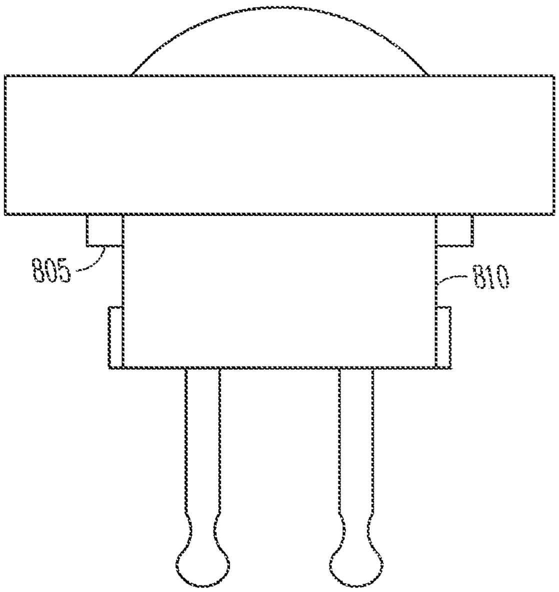
FIG. 8 is a block cross sectional view of a module having a different connection mechanism to provide a sealed connection with a socket according to an example embodiment.

FIG. 8 is an alternative embodiment 800 to the module 505 of FIG. 5, where the sealing member 805 is positioned over the base 810 of module 800. The pins are also similar in that they provide friction fit with connectors on a board.

Figure 9:
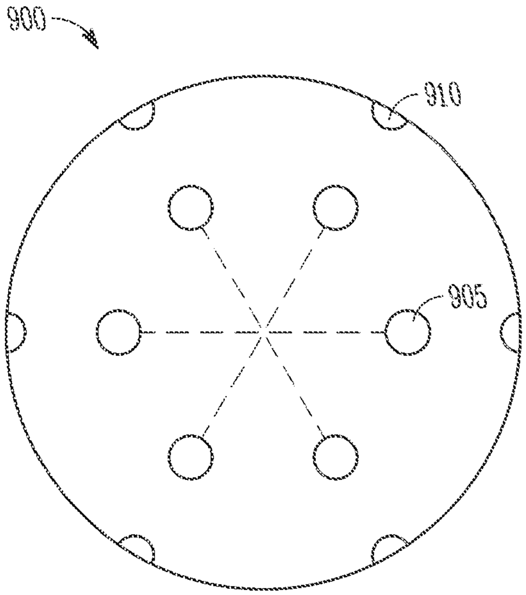
FIG. 9 is a top view of connectors on a board for providing electrical connection to a module according to an example embodiment.

FIG. 9 is a block diagram schematic view of the bottom of a socket 900, into which pins of the modules may be inserted. Six openings 905 are illustrated, representative of connectors for three differently oriented sets of pins. Also shown are grooves for providing a guide so modules are properly inserted.

Figure 10:
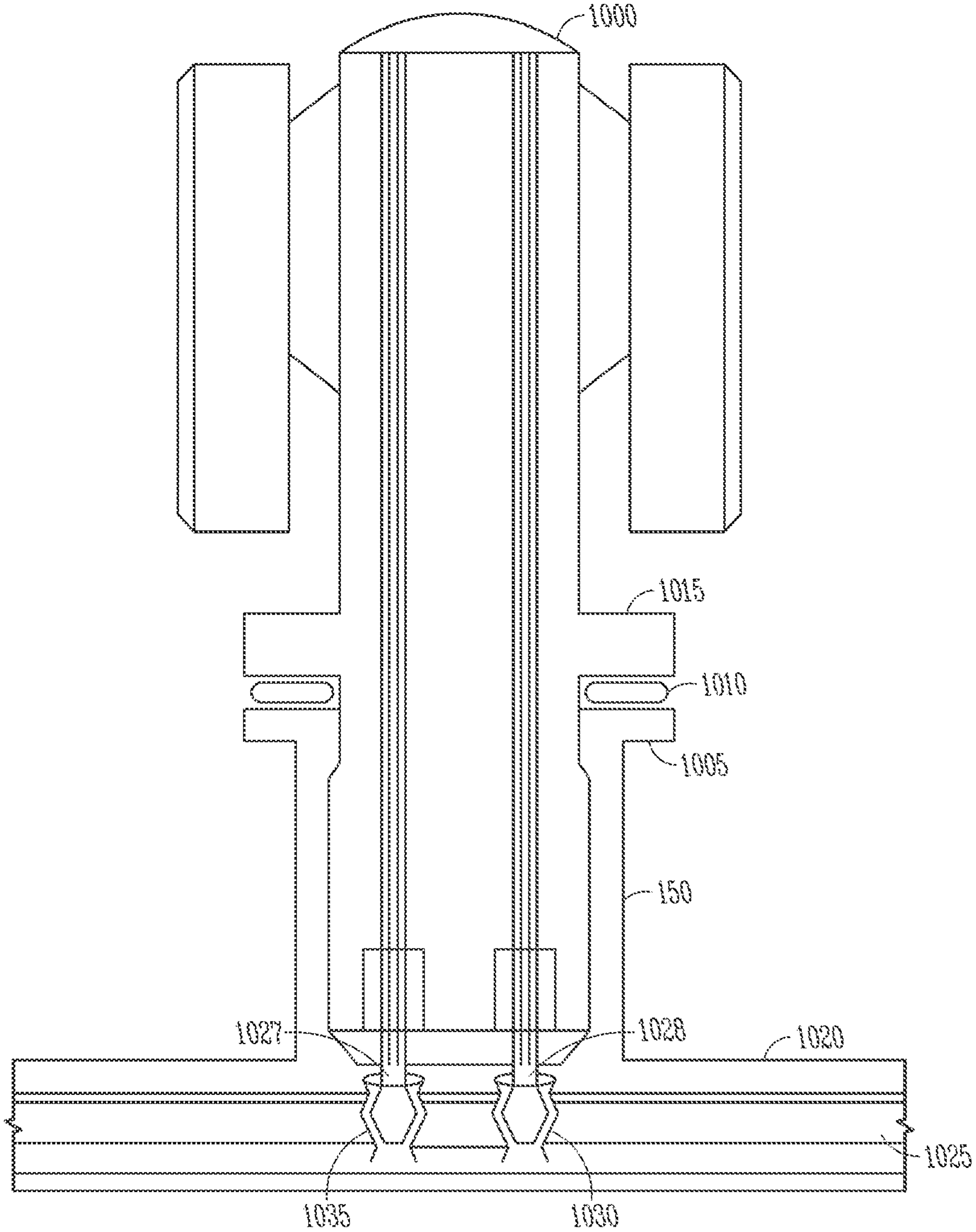
FIG. 10 is a block cross section view of an alternative module supported in a socket according to an example embodiment.

FIG. 10 is an alternative embodiment of a module 1000 plugged into a socket 150. In this embodiment, socket 150 has a flange 1005 at a module receiving end that operates to provide a surface for compression of sealing material 1010 between flange 1005 and a ring 1015 formed on a base of module 1000. Socket 150 also has a second flange 1020 formed on a second end that abuts board 1025. In this embodiment, pins 1027, 1028 extend a short distance from a body 1030 of module 1000 to mate with female connectors 1035 and 1040. The female connectors 1035, 1040 may extend beyond the circuit board into the compressible adhesive material 1045 in some embodiments.

Figure 11:
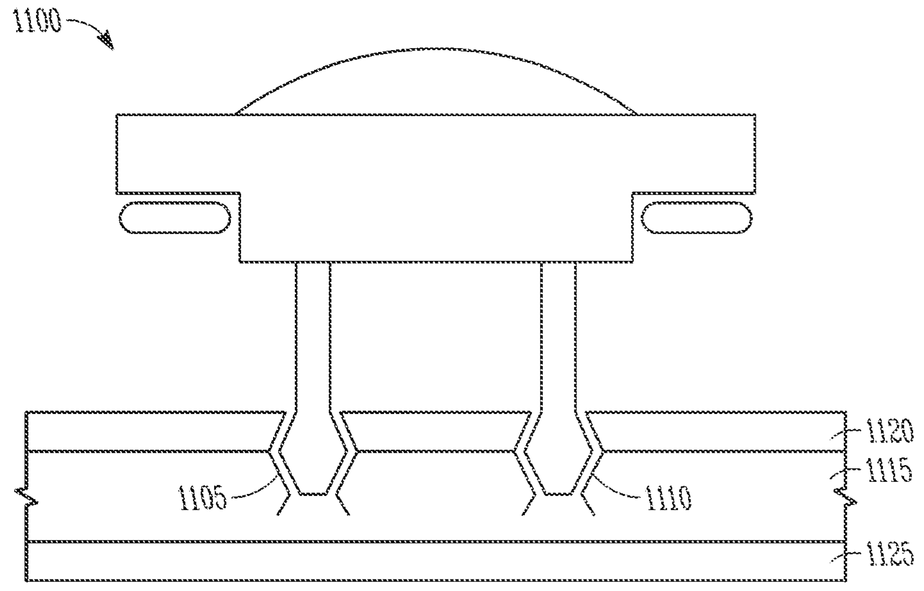
FIG. 11 is a block cross section view of an alternative module for plugging into a board according to an example embodiment.

FIG. 11 shows an alternative module 1100, wherein the female connectors 1105 and 1110 extend significantly into a compliant adhesive material 1115 between boards 1120 and 1125. The material 1115 provides additional spring force for maintaining retentive force on the pins via female connectors 1105 and 1110. In one embodiment, the material 1115 may be a liquid rubber, latex, or silicon type material that is pliable and provides good adhesion over the boards.

Figure 12:
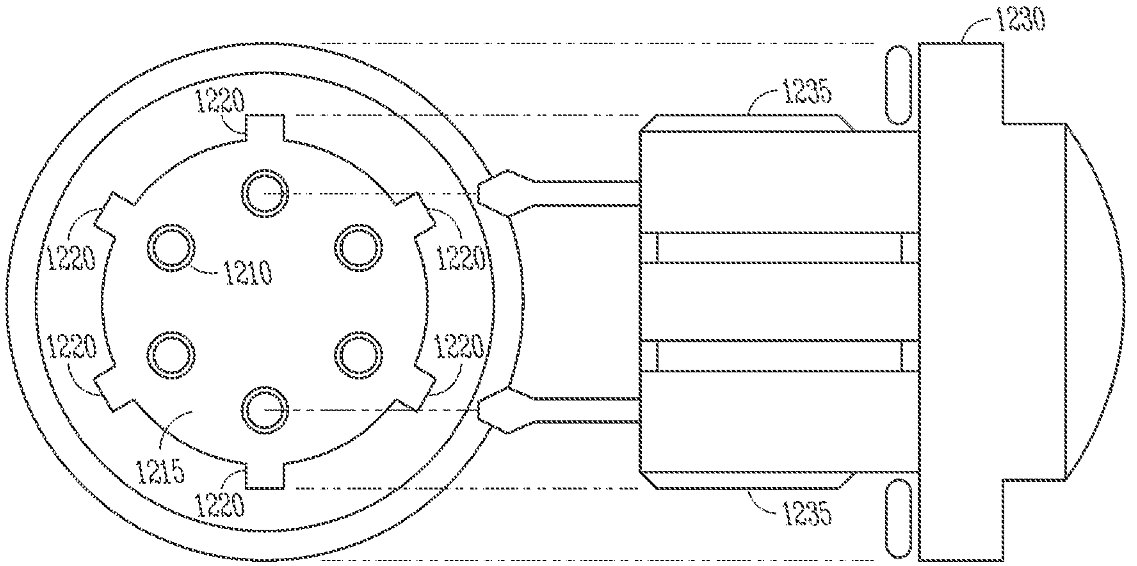
FIG. 12 is a top view of a connector and side view of a module for plugging into the connector according to a further example embodiment.

FIG. 12 is a top view of multiple sets of female connectors 1210 on a board 1215 for mating with pins of a module 1230. Grooves 1220 are also provided in the sides of the socket corresponding to the connectors to provide for guiding the module 1230 having a pair of mating ridges 1235. In one embodiment, the module may be coupled to one of three different sets of connectors by rotating the module and inserting it. The positions in which the module may be inserted may be referred to as A, B and C in one embodiment. Position A may correspond to wiring on the board such that 80 modules may be inserted into sockets to provide lighting for an application requiring that amount of light. Position B may accommodate 120 modules, while position C may accommodate 160 modules. The particular numbers of modules may be varied considerably in different embodiments. In one embodiment, two grooves 1220 may be provided, and rotated to different positions to ensure that the module is properly inserted depending on the application desired. Templates may also be used for each different configuration to help a user insert modules into the proper sockets. After use of the template, the remaining open sockets may have plugs inserted to ensure that the lighting fixture is properly sealed.

The Abstract is provided to comply with 37 C.F.R. § 1.72(b) to allow the reader to quickly ascertain the nature and gist of the technical disclosure. The Abstract is submitted with the understanding that it will not be used to interpret or limit the scope or meaning of the claims.

The invention claimed is:

1. A high intensity bright light emitting diode light bulb comprising:

a heat sink;

an integrated base thermally coupled to the heat sink;

a high intensity bright light emitting diode thermally coupled to the base and heat sink;

a pair of high intensity light emitting diode contacts extending from the high intensity bright light emitting diode and coupled to the integrated base and heat sink, each high intensity bright light emitting diode contact to electrically couple to corresponding power source contacts, wherein said power source contacts are removably coupled to a power supply to produce high intensity bright light;

wherein the high intensity, light emitting diode contacts, and power source contacts fit to connect their respective contacts.

2. The light emitting diode light bulb of claim 1 wherein the pair of high intensity light emitting diode contacts comprise male connectors for mating with the power source contacts.

3. The light emitting diode light bulb of claim 1 and further comprising a lens optically coupled to the high intensity bright light emitting diode to provide a widely dispersed beam of light.

4. The light emitting diode light bulb of claim 3 wherein the lens of the high intensity bright light emitting diode is adhered to the base and heat sink to provide a seal to protect the light emitting diode.

* * * * *